Dec. 12, 1933.    F. A. SMITH    1,939,233
AUTOMOBILE LOCK STRUCTURE
Filed Oct. 24, 1932    2 Sheets-Sheet 1
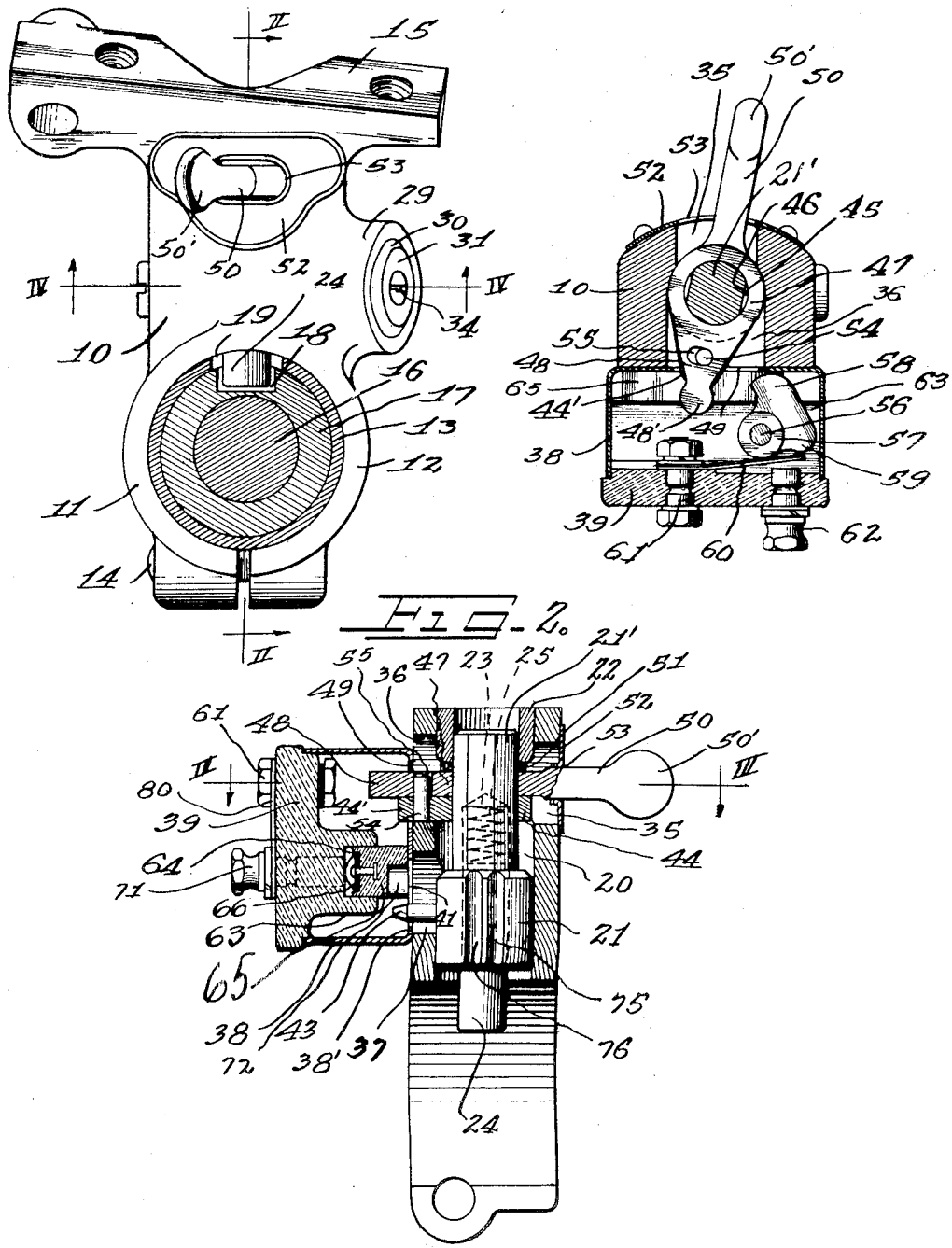
Inventor
Frederick A. Smith.
by Charles Hill
Attys.

Patented Dec. 12, 1933

1,939,233

UNITED STATES PATENT OFFICE 1,939,233

AUTOMOBILE LOCK STRUCTURE

Frederick A. Smith, North Chicago, Ill., assignor to Oakes Products Corporation, North Chicago, Ill., a corporation of Michigan Application October 24, 1932. Serial No. 639,313

10 Claims. (Cl. 200—44)

This invention relates to lock structures for automotive vehicles particularly adaptable for locking control elements such as the steering, ignition and starting elements.

The important object of the invention is to provide a compact unitary structure in which is combined a locking bolt element for locking and unlocking the steering, a switch element for controlling the ignition circuit, and another switch element for controlling the starting motor circuit, together with interlocking means between the elements whereby the functioning of certain elements is dependent upon the relative positions of all of the elements.

Another object is to provide a unitary lock structure in which key operable means are provided for shifting the locking bolt to locking or unlocking position and a manually operable lever is provided and connected with the switch elements for operation of both of such switch elements or for operation of only one thereof, together with interlocking means whereby the operation of said switch elements or said locking bolt element is dependent upon the relative positions of the elements.

The various features of construction, arrangement and operation of my invention are shown incorporated in the structure disclosed on the drawings, in which drawings Figure 1 is a plan view of the lock structure with the steering column and steering post with which the lock structure is associated shown in section;

Figure 2 is a section on plane II—II of Figure 1;

Figure 3 is a section on plane III—III of Figure 2;

Figure 4 is a section on plane IV—IV of Figure 1;

Figure 5 is a rear elevation;

Figure 6 is a rear elevation of the switch structure housing with the cover removed; and Figure 7 is an inner side view of the switch housing cover.

The lock structure shown comprises a body or housing 10 having at its outer end semi-annular extensions 11 and 12 for receiving the steering column 13 of an automobile, the extensions being clamped around the column as by means of a bolt 14. At its inner end the body has the transversely extending flange 15 by means of which it may be secured to a suitable support as, for example, the dash board of an automobile. Extending through the steering column is the steering post 16 which, at its upper end, terminates in the steering wheel (not shown) and on this post is secured a collar 17 having a lock notch 18 in one side thereof which is adapted to register with the hole 19 in the steering column when the steering wheel comes to a certain position, usually in position for straight forward travel of the automobile. The body has the longitudinal cylindrical bore 20 which is concentric with the hole 19 through the steering column and within the bore is the cylindrical lock bolt 21 having its inner end 21' of reduced diameter, this reduced end extending through a bushing 22 secured in the rear end of the bore 20. Within the bolt structure is the axial pocket 23 for guiding the lock bolt or plunger 24, a spring 25 in the bottom of the pocket abutting the plunger and tending to shift it outwardly, the movement of the bolt being limited by a stop plate 26 extending through the transverse slot 27 in the bolt 21 and into the slot 28 cut in the plunger.

The lateral projection 29 on the body 10 provides a cylindrical pocket for a lock cylinder 30 through which extends a lock barrel 31 having at its inner end a cam disc 32 whose center is at one side of the axis of the barrel. This cam disc extends into a slot or channel 33 formed in the bolt 21 and upon the insertion of a suitable key in the key-hole 34 of the lock barrel, the barrel may be turned to swing the cam disc 32 and to shift the lock bolt structure axially into locking or unlocking position, the movement of the disc being through 180° so that at the end of its movement the lock bolt element will be held axially in either its locking or unlocking position. When the lock bolt element is shifted forwardly, the bolt 24 will enter the hole 19 in the steering column, and if the notch 18 in the collar 17 on the steering post is in alignment with the hole 19 the bolt will enter the notch by force of the spring 25 and the steering post and column will be locked together so that the steering wheel cannot be turned.

At its front side the housing 10 has the passageway 35 and at its rear end the housing has the passageway 36 in alignment with the passageway 35 and the passageway 37 below the passageway 36. Secured with its base 38' against the rear side of the housing over the passageways 36 and 37 is the rectangular switch housing 38, for which is provided a cover 39 which is preferably of insulating material, the cover and the switch housing being secured as by means of screws 40 extending through the cover and threading into the body 10. The housing base 38' has a slot 41 extending parallel with the axis of the lock bolt 21 and from the inner end of this slot 41 a slot 42 extends toward the left and transversely of the lock bolt axis, these slots being in register with the rear passageway 37 in the body 10. Extending from the lock bolt 21 through the passageway 37 is a pin 43 for cooperation with the slots 41 and 42. When the lock bolt is in its outer or steering-locking position, the pin is within the longitudinal slot 41 and the lock bolt cannot then be rotated but when the lock bolt has been shifted to its inner ing bolt then sliding through the hubs 44 and 47. Such shift of the locking bolt carries its pin 43 into the slot 72 of the switch block and into the transverse slot 42 in the base of the switch housing, the bolt being then free for rotation by swinging the lever arm 50 toward the right (Figure 1). When the lever is swung toward the right the ball 77 leaves the groove 75 and enters the groove 76 and during rotation of the lock bolt for this engagement the switch block was shifted to carry the ends of its switch blade out of the friction pockets 73 and 74 and into electrical engagement within the terminal posts 70 and 71 for closure of the ignition circuit. The lever is now in an intermediate position with the cylindrical end 48' thereof in engagement with the adjacent end 58 of the cam lever 57, one end of the elongated slot 55 in the lever abutting the pin 54, by which abutting engagement the hub 44 and consequently the lock bolt was rotated. During the short final movement of the lever 50 to the right (Figure 1) the cam lever 57 will be rotated to force the contact bar 60 against the terminal post 62 for closure of the starting motor circuit and the lever is held in this final position until the engine has been started and is self-operating. Then when the lever is released the spring force of the switch bar will swing back the cam lever and the operating lever 50 to the extent of the length of the slot 55. The short final movement of the lever 50 to the right causes a slight further rotational movement of the locking bolt but such additional rotational movement is not sufficient to disconnect the ends of the switch blade 66 from the terminal posts 70 and 71 and the ignition circuit remains closed. During such additional rotation of the locking bolt the ball 77 will be moved partially out of the groove 76 against the force of the spring 77 and then when the lever 50 is released after closure of the starting switch the force of the spring 78 tending to push the ball back into the groove 76 will assist the spring action of the switch bar to effect return of the lock bolt to its position in which it will be then held by the ball 77.

When both switches are closed current will flow from the battery B to the terminal post 61 and through a cross conductor 80 to the terminal post 71. The current will flow through the switch bar 60 to terminal post 62 and then through the winding of the relay R for closure of the switch S and connection with the battery of the starting motor M. Current also flows from the terminal post 71 through the switch blade 66 to the terminal post 70 and then through the primary winding of the ignition coil I. After starting of the engine and release of the switch lever 50 the starting switch is opened but the ignition circuit remains closed for self-operation of the engine. Should the engine stall or accidentally stop the lever 50 is swung from its intermediate position back to its final position for reclosure of the starting switch and restarting of the engine, and is then released for reopening of the starting switch.

With the switchlever 50 in position for closure of the ignition switch or both switches it will be impossible to shift the locking bolt back to locking position because the pin 43 is at that time in the transverse slot 42 and before the bolt can be shifted back to locking position the switch lever must be swung back to its extreme left position to bring the pin 43 into alignment with the longitudinal slot 41. In this position of the locking bolt and its pin it will be impossible to operate the switch lever for closure of either switch. The ability to operate the locking bolt or the switches thus depends upon the relative positions of these elements.

After shifting the locking bolt inwardly to unlocking position preparatory to starting the engine, the operator usually will swing the lever 50 its full distance to the right to close both switches and then when the engine has been started and is self-operating he will release the lever for return thereof to an intermediate position in which the ignition switch remains closed and at the end of a run he swings the lever 50 back to its position toward the left to open the ignition circuit and stop the engine and he then turns the key in the lock to shift the lock bolt into its locking position, the steering post and the switches being then locked against operation.

I thus produce a compact and efficient unitary structure for controlling and locking the steering, ignition, and starting in a motor vehicle, both switches being operable by a single manually actuated lever. I do not desire to be limited to the exact construction, arrangement and operation shown and described as changes and modifications may be made without departing from the scope and spirit of the invention as defined by the appended claims.

I claim as my invention:

1. A unitary structure for the purpose described, in which is combined a rotatable and axially shiftable lock bolt, key operable means for shifting said bolt axially to locking or unlocking position, a rotatable lever fulcrumed on said locking bolt, a starting switch, a connection between said starting switch and said lever controlling the operation of said switch when said lever is rotated, a connection between said lever and said locking bolt for causing rotation of said bolt when said lever is rotated, an ignition switch, a connection between said ignition switch and said locking bolt for operating said switch when said bolt is rotated, there being lost motion in the connection between said lever and said locking bolt whereby said starting switch may be operated independently of movement of said ignition switch.

2. In a unitary structure for the purpose described, the combination of a rotatable and axially shiftable locking bolt, key controlled means for shifting said bolt axially to locking or unlocking position, a lever fulcrumed on said bolt for rotational movement thereon, a lost motion coupling between said lever and said bolt for rotating said bolt with said lever during part of its rotational movement, a starting switch and means for causing closure thereof when said lever is rotated in one direction, an ignition switch, a connection whereby rotation of said bolt will close said ignition switch when said lever is rotated to cause closure of said starting switch, said lost motion coupling permitting a return movement of said lever for opening of said starting switch without opening said ignition switch.

3. In a unitary structure for the purpose described, the combination of a rotatable and axially shiftable locking bolt, key controlled means for shifting said bolt axially to locking or unlocking position, a lever fulcrumed on said bolt for rotational movement thereon, a lost motion coupling between said lever and said bolt for rotating said bolt with said lever during part of its rotational movement, a starting switch and means for causing closure thereof when said lever is rotated in one direction, an ignition switch, a connection whereby rotation of said bolt will close said ignition switch when said lever is rotated to cause closure of said starting switch, said lost motion coupling permitting a return movement of said lever for opening of said starting switch without opening said ignition switch, means preventing rotation of said bolt when it is in locking position and means preventing axial movement thereof after rotation thereof to switch-closing position.

4. A unitary locking structure for the purpose described comprising in combination a supporting body, a locking bolt rotatable and axially shiftable in said body, key-operable means for shifting said bolt axially, a switch housing mounted on the rear side of said body, a switch lever extending through said body into said housing and fulcrumed on said locking bolt, a starting switch within said housing and a connection within said housing for engagement by said lever for operation to cause closure of said switch, a guideway within said housing extending transversely of the locking bolt axis, an ignition switch comprising a switch block shiftable in said guideway, a connection between said lever and said switch block including said locking bolt whereby movement of said lever for closure of said starting switch will cause shift of said switch block for closure of the ignition switch, said connection between said lever and switch block having sufficient lost motion for a partial return movement of said lever and opening of the starting switch without opening of the ignition switch.

5. In a unitary lock structure for the purpose described, the combination of a supporting body, a lock bolt rotatable and axially shiftable in said body, means for shifting said bolt to locking or unlocking position, a switch housing mounted on said body, a switch lever extending through said body into said housing and fulcrumed on said bolt, a cover for said switch housing, a starting switch comprising a switch bar and terminals therefor supported by said cover, means within said housing cooperable with said lever to cause closure of said switch when said lever is swung, a guideway formed in said cover and extending transversely of the axis of said locking bolt, an ignition switch comprising a switch block shiftable in said guideway and a switch blade on said block and terminals extending through said cover, a connection between said lever and said switch block including said locking bolt and causing shift of said switch block for closure of the ignition switch when said lever is swung for closure of said starting switch, said connection between said lever and ignition switch having sufficient lost motion for partial return movement of said lever for opening of said starting switch without opening said ignition switch.

6. In a unitary lock structure for the purpose described, the combination of a supporting body, a lock bolt rotatable and axially shiftable in said body, means for shifting said bolt to locking or unlocking position, a switch housing mounted on said body, a switch lever extending through said body into said housing and fulcrumed on said bolt, a cover for said switch housing, a starting switch comprising a switch bar and terminals therefor supported by said cover, means within said housing cooperable with said lever to cause closure of said switch when said lever is swung, a guideway formed in said cover and extending transversely of the axis of said locking bolt, an ignition switch comprising a switch block shiftable in said guideway and a switch blade on said block and terminals extending through said cover, a connection between said lever and said switch block including said locking bolt and causing shift of said switch block for closure of the ignition switch when said lever is swung for closure of said starting switch, said connection between said lever and ignition switch having sufficient lost motion for partial return movement of said lever for opening of said starting switch without opening said ignition switch, and means for preventing closure of said switches when said locking bolt is in locking position.

7. In combination, a shaft, a lever for rotating said shaft, a switch in the path of said lever for operation thereby, an actuating member on said shaft, a second switch adapted for operation by said member when said shaft is turned by said lever, and means for axially shifting said shaft to bring said actuating member into or out of operative engagement with said second switch.

8. In combination, a rotatable lever, a switch in the path of said lever for operation thereby, a rotatable shaft forming a fulcrum support for said lever and being axially shiftable relative thereto, actuating means on said shaft, a second switch adapted for operation by said actuating means when said shaft is turned, and means for shifting said shaft to move said actuating means into or out of operative engagement with said second switch.

9. In combination, a rotatable lever and a switch positioned to be operated thereby, a rotatable shaft forming a fulcrum support for said lever, a connection for causing said shaft to rotate with said lever but permitting axial shift of said shaft relative to said lever, a second switch, actuating means for said second switch controlled by the rotation of said shaft, and means for shifting said shaft to move said actuating means into or out of operative engagement with said second switch, said connection having lost motion whereby said lever may be rotated to control said first mentioned switch without rotating said shaft.

10. In combination, a supporting body, a shaft rotatable and axially shiftable in said body, a switch housing mounted on said body, a switch lever extending through said body into said housing and fulcrumed on said shaft, a cover for said switch housing, a starting switch comprising a switch bar and terminals therefor supported by said cover, means within said housing cooperable with said lever to cause closure of said switch when said lever is swung, a guideway formed in said cover and extending transversely of the axis of said shaft, an ignition switch comprising a switch block shiftable in said guideway and a switch blade on said block and terminals extending through said cover, a connection between said lever and said switch block including said shaft and causing shift of said switch block for closure of said ignition switch when said lever is swung for closure of said starting switch, said connection between said lever and ignition switch having sufficient lost motion for partial return movement of said lever for opening of said starting switch without opening of said ignition switch.

FREDERICK A. SMITH.

Dec. 12, 1933.  F. A. SMITH  1,939,234
LOCK STRUCTURE
Filed Oct. 24, 1932    2 Sheets-Sheet 1
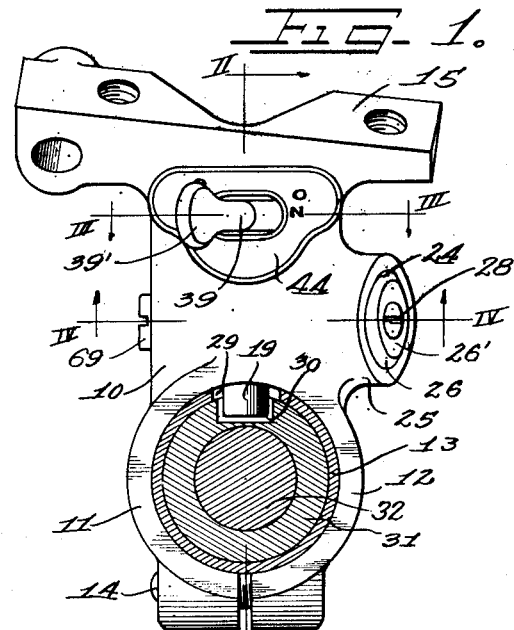
Inventor
Frederick A. Smith.
by Charles Hill
Attys.